US011399096B2

(12) United States Patent
Chishti

(10) Patent No.: US 11,399,096 B2
(45) Date of Patent: Jul. 26, 2022

(54) TECHNIQUES FOR DATA MATCHING IN A CONTACT CENTER SYSTEM

(71) Applicant: Afiniti, Ltd., Hamilton (BM)

(72) Inventor: Zia Chishti, Washington, DC (US)

(73) Assignee: Afiniti, Ltd., Hamilton (BM)

( * ) Notice: Subject to any disclaimer, the term of this patent is extended or adjusted under 35 U.S.C. 154(b) by 0 days.

(21) Appl. No.: 15/826,093

(22) Filed: Nov. 29, 2017

(65) Prior Publication Data
US 2019/0166254 A1 May 30, 2019

(51) Int. Cl.
*H04M 3/00* (2006.01)
*H04M 5/00* (2006.01)
(Continued)

(52) U.S. Cl.
CPC ...... *H04M 3/5232* (2013.01); *G06F 16/2365* (2019.01); *G06F 16/27* (2019.01);
(Continued)

(58) Field of Classification Search
CPC .. H04M 3/5232; H04M 3/5233; H04M 3/523; H04M 3/5235; H04M 3/5175;
(Continued)

(56) References Cited

U.S. PATENT DOCUMENTS 5,155,763 A 10/1992 Bigus et al.
5,206,903 A 4/1993 Kohler et al.
(Continued)

FOREIGN PATENT DOCUMENTS

AU 2008349500 C1 5/2014
AU 2009209317 B2 5/2014
(Continued)

OTHER PUBLICATIONS

Afiniti, "Afiniti® Enterprise Behavioral Pairing™ Improves Contact Center Performance," White Paper, retreived online from URL: <http://www.afiniti.com/wp-content/uploads/2016/04/Afiniti_White-Paper_Web-Email.pdf> 11 pages (2016).
(Continued)

*Primary Examiner* — Kharye Pope
(74) *Attorney, Agent, or Firm* — Wilmer Cutler Pickering Hale and Dorr LLP

(57) ABSTRACT

Techniques for data matching in a contact center system are disclosed. In one particular embodiment, the techniques may be realized as a method for data matching in a contact center system comprising determining, by at least one computer processor communicatively coupled to and configured to operate in the contact center system, an interaction event time associated with a historical contact interaction; determining, by the at least one computer processor, an outcome event time associated with a historical contact interaction outcome; analyzing, by the at least one computer processor, the interaction event time and the outcome event time to determine a correlation; and matching, by the at least one computer processor, the historical contact interaction with the historical contact interaction outcome based on the correlation.

29 Claims, 3 Drawing Sheets

(51) Int. Cl.
  *H04M 3/523* (2006.01)
  *G06F 16/27* (2019.01)
  *G06F 16/23* (2019.01)
  *G06Q 10/06* (2012.01)
  *G06Q 30/00* (2012.01)

(52) U.S. Cl.
  CPC . *G06Q 10/06311* (2013.01); *G06Q 10/06315* (2013.01); *G06Q 30/01* (2013.01); *H04M 2203/551* (2013.01); *H04M 2203/556* (2013.01); *H04M 2203/558* (2013.01)

(58) Field of Classification Search
  CPC .. H04M 3/5191; H04M 3/5183; H04M 7/006; H04M 3/42323; G06Q 10/06; G06Q 10/0633; G06Q 10/0635; G06Q 30/016; G06Q 30/01
  USPC ............ 379/265.12, 265.11, 265.09, 265.02, 379/265.06, 265.05, 265.1, 266.01, 379/265.13, 265.14, 266.03
  See application file for complete search history.

(56) References Cited

U.S. PATENT DOCUMENTS

| | | | |
|---|---|---|---|
| 5,327,490 A | 7/1994 | Cave | |
| 5,537,470 A | 7/1996 | Lee | |
| 5,702,253 A | 12/1997 | Bryce et al. | |
| 5,825,869 A | 10/1998 | Brooks et al. | |
| 5,903,641 A | 5/1999 | Tonisson | |
| 5,907,601 A | 5/1999 | David et al. | |
| 5,926,538 A | 7/1999 | Deryugin et al. | |
| 6,049,603 A | 4/2000 | Schwartz et al. | |
| 6,052,460 A | 4/2000 | Fisher et al. | |
| 6,064,731 A | 5/2000 | Flockhart et al. | |
| 6,088,444 A | 7/2000 | Walker et al. | |
| 6,163,607 A | 12/2000 | Bogart et al. | |
| 6,222,919 B1 | 4/2001 | Hollatz et al. | |
| 6,252,946 B1 * | 6/2001 | Glowny | H04M 3/36 379/111 |
| 6,292,555 B1 | 9/2001 | Okamoto | |
| 6,324,282 B1 | 11/2001 | McIllwaine et al. | |
| 6,333,979 B1 | 12/2001 | Bondi et al. | |
| 6,389,132 B1 | 5/2002 | Price | |
| 6,389,400 B1 | 5/2002 | Bushey et al. | |
| 6,408,066 B1 | 6/2002 | Andruska et al. | |
| 6,411,687 B1 | 6/2002 | Bohacek et al. | |
| 6,424,709 B1 | 7/2002 | Doyle et al. | |
| 6,434,230 B1 | 8/2002 | Gabriel | |
| 6,496,580 B1 | 12/2002 | Chack | |
| 6,504,920 B1 | 1/2003 | Okon et al. | |
| 6,519,335 B1 | 2/2003 | Bushnell | |
| 6,535,600 B1 | 3/2003 | Fisher et al. | |
| 6,535,601 B1 | 3/2003 | Flockhart et al. | |
| 6,570,980 B1 | 5/2003 | Baruch | |
| 6,587,556 B1 | 7/2003 | Judkins et al. | |
| 6,603,854 B1 | 8/2003 | Judkins et al. | |
| 6,639,976 B1 | 10/2003 | Shellum et al. | |
| 6,661,889 B1 | 12/2003 | Flockhart et al. | |
| 6,704,410 B1 | 3/2004 | McFarlane et al. | |
| 6,707,904 B1 | 3/2004 | Judkins et al. | |
| 6,714,643 B1 | 3/2004 | Gargeya et al. | |
| 6,744,878 B1 | 6/2004 | Komissarchik et al. | |
| 6,763,104 B1 | 7/2004 | Judkins et al. | |
| 6,774,932 B1 | 8/2004 | Ewing et al. | |
| 6,775,378 B1 | 8/2004 | Villena et al. | |
| 6,798,876 B1 | 9/2004 | Bala | |
| 6,829,348 B1 | 12/2004 | Schroeder et al. | |
| 6,832,203 B1 | 12/2004 | Villena et al. | |
| 6,859,529 B2 | 2/2005 | Duncan et al. | |
| 6,922,466 B1 | 7/2005 | Peterson et al. | |
| 6,937,715 B2 | 8/2005 | Delaney | |
| 6,956,941 B1 | 10/2005 | Duncan et al. | |
| 6,970,554 B1 * | 11/2005 | Peterson | H04M 3/42221 379/265.06 |
| 6,970,821 B1 | 11/2005 | Shambaugh et al. | |
| 6,978,006 B1 | 12/2005 | Polcyn | |
| 7,023,979 B1 | 4/2006 | Wu et al. | |
| 7,039,166 B1 | 5/2006 | Peterson et al. | |
| 7,050,566 B2 | 5/2006 | Becerra et al. | |
| 7,050,567 B1 | 5/2006 | Jensen | |
| 7,062,031 B2 | 6/2006 | Becerra et al. | |
| 7,068,775 B1 | 6/2006 | Lee | |
| 7,092,509 B1 | 8/2006 | Mears et al. | |
| 7,103,172 B2 | 9/2006 | Brown et al. | |
| 7,158,628 B2 | 1/2007 | McConnell et al. | |
| 7,184,540 B2 | 2/2007 | Dezonno et al. | |
| 7,209,549 B2 | 4/2007 | Reynolds et al. | |
| 7,231,032 B2 | 6/2007 | Nevman et al. | |
| 7,231,034 B1 | 6/2007 | Rikhy et al. | |
| 7,236,584 B2 | 6/2007 | Torba | |
| 7,245,716 B2 | 7/2007 | Brown et al. | |
| 7,245,719 B2 | 7/2007 | Kawada et al. | |
| 7,266,251 B2 | 9/2007 | Rowe | |
| 7,269,253 B1 | 9/2007 | Wu et al. | |
| 7,353,388 B1 | 4/2008 | Gilman et al. | |
| 7,398,224 B2 | 7/2008 | Cooper | |
| 7,593,521 B2 | 9/2009 | Becerra et al. | |
| 7,676,034 B1 | 3/2010 | Wu et al. | |
| 7,725,339 B1 | 5/2010 | Aykin | |
| 7,734,032 B1 | 6/2010 | Kiefhaber et al. | |
| 7,798,876 B2 | 9/2010 | Mix | |
| 7,826,597 B2 | 11/2010 | Berner et al. | |
| 7,864,944 B2 | 1/2011 | Khouri et al. | |
| 7,899,177 B1 | 3/2011 | Bruening et al. | |
| 7,916,858 B1 | 3/2011 | Heller et al. | |
| 7,940,917 B2 | 5/2011 | Lauridsen et al. | |
| 7,961,866 B1 | 6/2011 | Boutcher et al. | |
| 7,995,717 B2 | 8/2011 | Conway et al. | |
| 8,000,989 B1 | 8/2011 | Kiefhaber et al. | |
| 8,010,607 B2 | 8/2011 | McCormack et al. | |
| 8,094,790 B2 | 1/2012 | Conway et al. | |
| 8,126,133 B1 | 2/2012 | Everingham et al. | |
| 8,140,441 B2 | 3/2012 | Cases et al. | |
| 8,175,253 B2 | 5/2012 | Knott et al. | |
| 8,229,102 B2 | 7/2012 | Knott et al. | |
| 8,249,245 B2 | 8/2012 | Jay et al. | |
| 8,295,471 B2 | 10/2012 | Spottiswoode et al. | |
| 8,300,797 B1 * | 10/2012 | Benesh | H04M 3/5175 379/265.03 |
| 8,300,798 B1 | 10/2012 | Wu et al. | |
| 8,359,219 B2 | 1/2013 | Chishti et al. | |
| 8,433,597 B2 | 4/2013 | Chishti et al. | |
| 8,438,089 B1 * | 5/2013 | Wasserblat | G06Q 40/02 704/270 |
| 8,472,611 B2 | 6/2013 | Chishti | |
| 8,565,410 B2 | 10/2013 | Chishti et al. | |
| 8,634,542 B2 | 1/2014 | Spottiswoode et al. | |
| 8,644,490 B2 | 2/2014 | Stewart | |
| 8,670,548 B2 | 3/2014 | Xie et al. | |
| 8,699,694 B2 | 4/2014 | Chishti et al. | |
| 8,712,821 B2 | 4/2014 | Spottiswoode | |
| 8,718,271 B2 | 5/2014 | Spottiswoode | |
| 8,724,797 B2 | 5/2014 | Chishti et al. | |
| 8,731,178 B2 | 5/2014 | Chishti et al. | |
| 8,737,595 B2 | 5/2014 | Chishti et al. | |
| 8,750,488 B2 | 6/2014 | Spottiswoode et al. | |
| 8,761,380 B2 | 6/2014 | Kohler et al. | |
| 8,781,100 B2 | 7/2014 | Spottiswoode et al. | |
| 8,781,106 B2 | 7/2014 | Afzal | |
| 8,787,532 B1 * | 7/2014 | Adam | H04M 3/5175 379/265.06 |
| 8,792,630 B2 | 7/2014 | Chishti et al. | |
| 8,824,658 B2 | 9/2014 | Chishti | |
| 8,831,207 B1 | 9/2014 | Agarwal | |
| 8,879,715 B2 | 11/2014 | Spottiswoode et al. | |
| 8,903,079 B2 | 12/2014 | Xie et al. | |
| 8,913,736 B2 | 12/2014 | Kohler et al. | |
| 8,929,537 B2 | 1/2015 | Chishti et al. | |
| 8,938,063 B1 | 1/2015 | Hackbarth et al. | |
| 8,995,647 B2 | 3/2015 | Li et al. | |
| 9,020,137 B2 | 4/2015 | Chishti et al. | |
| 9,025,757 B2 | 5/2015 | Spottiswoode et al. | |
| 9,129,290 B2 * | 9/2015 | Kannan | G06N 7/005 |

(56) References Cited

U.S. PATENT DOCUMENTS

| | | | |
|---|---|---|---|
| 9,215,323 B2 | 12/2015 | Chishti | |
| 9,277,055 B2 | 3/2016 | Spottiswoode et al. | |
| 9,300,802 B1 | 3/2016 | Chishti | |
| 9,426,296 B2 | 8/2016 | Chishti et al. | |
| 9,596,344 B2 | 3/2017 | Lum et al. | |
| 9,712,676 B1 | 7/2017 | Chishti | |
| 9,712,679 B2 | 7/2017 | Chishti et al. | |
| 9,936,066 B1* | 4/2018 | Mammen | G10L 15/26 |
| 10,171,671 B1* | 1/2019 | Prasad | H04M 3/42068 |
| 10,237,405 B1* | 3/2019 | Neuer, III | H04M 3/5175 |
| 2001/0032120 A1 | 10/2001 | Stuart et al. | |
| 2002/0018554 A1 | 2/2002 | Jensen et al. | |
| 2002/0046030 A1 | 4/2002 | Haritsa et al. | |
| 2002/0059164 A1 | 5/2002 | Shtivelman | |
| 2002/0067821 A1* | 6/2002 | Benson | H04M 3/51 379/265.02 |
| 2002/0082736 A1 | 6/2002 | Lech et al. | |
| 2002/0110234 A1 | 8/2002 | Walker et al. | |
| 2002/0111172 A1 | 8/2002 | DeWolf et al. | |
| 2002/0131399 A1 | 9/2002 | Philonenko | |
| 2002/0138285 A1 | 9/2002 | DeCotiis et al. | |
| 2002/0143599 A1 | 10/2002 | Nourbakhsh et al. | |
| 2002/0161765 A1 | 10/2002 | Rot et al. | |
| 2002/0184069 A1 | 12/2002 | Kosiba et al. | |
| 2002/0196845 A1 | 12/2002 | Richards et al. | |
| 2003/0002653 A1 | 1/2003 | Uckun | |
| 2003/0081757 A1 | 5/2003 | Mengshoel et al. | |
| 2003/0095652 A1 | 5/2003 | Mengshoel et al. | |
| 2003/0169870 A1 | 9/2003 | Stanford | |
| 2003/0174830 A1 | 9/2003 | Boyer et al. | |
| 2003/0217016 A1 | 11/2003 | Pericle | |
| 2004/0028211 A1 | 2/2004 | Culp et al. | |
| 2004/0057416 A1 | 3/2004 | McCormack | |
| 2004/0096050 A1 | 5/2004 | Das et al. | |
| 2004/0098274 A1 | 5/2004 | Dezonno et al. | |
| 2004/0101127 A1 | 5/2004 | Dezonno et al. | |
| 2004/0109555 A1 | 6/2004 | Williams | |
| 2004/0133434 A1 | 7/2004 | Szlam et al. | |
| 2004/0210475 A1 | 10/2004 | Starnes et al. | |
| 2004/0230438 A1 | 11/2004 | Pasquale et al. | |
| 2004/0267816 A1 | 12/2004 | Russek | |
| 2005/0013428 A1 | 1/2005 | Walters | |
| 2005/0043986 A1 | 2/2005 | McConnell et al. | |
| 2005/0047581 A1 | 3/2005 | Shaffer et al. | |
| 2005/0047582 A1 | 3/2005 | Shaffer et al. | |
| 2005/0071223 A1 | 3/2005 | Jain et al. | |
| 2005/0129212 A1 | 6/2005 | Parker | |
| 2005/0135593 A1 | 6/2005 | Becerra et al. | |
| 2005/0135596 A1 | 6/2005 | Zhao | |
| 2005/0187802 A1 | 8/2005 | Koeppel | |
| 2005/0195960 A1 | 9/2005 | Shaffer et al. | |
| 2005/0286709 A1 | 12/2005 | Horton et al. | |
| 2005/0287983 A1* | 12/2005 | Armanino | H04M 3/2218 455/405 |
| 2006/0089837 A1* | 4/2006 | Adar | H04M 3/2227 705/309 |
| 2006/0098803 A1 | 5/2006 | Bushey et al. | |
| 2006/0110052 A1 | 5/2006 | Finlayson | |
| 2006/0124113 A1 | 6/2006 | Roberts | |
| 2006/0184040 A1 | 8/2006 | Keller et al. | |
| 2006/0222164 A1 | 10/2006 | Contractor et al. | |
| 2006/0233346 A1 | 10/2006 | McIlwaine et al. | |
| 2006/0262918 A1 | 11/2006 | Karnalkar et al. | |
| 2006/0262922 A1 | 11/2006 | Margulies et al. | |
| 2007/0036323 A1 | 2/2007 | Travis | |
| 2007/0071222 A1 | 3/2007 | Flockhart et al. | |
| 2007/0116240 A1 | 5/2007 | Foley et al. | |
| 2007/0121602 A1 | 5/2007 | Sin et al. | |
| 2007/0121829 A1 | 5/2007 | Tal et al. | |
| 2007/0136342 A1 | 6/2007 | Singhai et al. | |
| 2007/0154007 A1 | 7/2007 | Bernhard | |
| 2007/0174111 A1 | 7/2007 | Anderson et al. | |
| 2007/0198322 A1 | 8/2007 | Bourne et al. | |
| 2007/0219816 A1 | 9/2007 | Van Luchene et al. | |
| 2007/0274502 A1 | 11/2007 | Brown | |
| 2008/0002823 A1 | 1/2008 | Fama et al. | |
| 2008/0008309 A1 | 1/2008 | Dezonno et al. | |
| 2008/0046386 A1 | 2/2008 | Pieraccinii et al. | |
| 2008/0065476 A1 | 3/2008 | Klein et al. | |
| 2008/0095355 A1* | 4/2008 | Mahalaha | H04M 3/5233 379/265.09 |
| 2008/0118052 A1 | 5/2008 | Houmaidi et al. | |
| 2008/0144803 A1 | 6/2008 | Jaiswal et al. | |
| 2008/0144804 A1* | 6/2008 | Mergen | H04M 3/5166 379/266.1 |
| 2008/0152122 A1 | 6/2008 | Idan et al. | |
| 2008/0162580 A1* | 7/2008 | Ben Harush | G06F 17/30699 |
| 2008/0181389 A1 | 7/2008 | Bourne et al. | |
| 2008/0199000 A1 | 8/2008 | Su et al. | |
| 2008/0205611 A1 | 8/2008 | Jordan et al. | |
| 2008/0267386 A1 | 10/2008 | Cooper | |
| 2008/0273687 A1 | 11/2008 | Knott et al. | |
| 2009/0043670 A1 | 2/2009 | Johansson et al. | |
| 2009/0086933 A1 | 4/2009 | Patel et al. | |
| 2009/0113242 A1* | 4/2009 | Miller | G06F 11/0709 714/25 |
| 2009/0190740 A1 | 7/2009 | Chishti et al. | |
| 2009/0190743 A1 | 7/2009 | Spottiswoode | |
| 2009/0190744 A1 | 7/2009 | Xie et al. | |
| 2009/0190745 A1 | 7/2009 | Xie et al. | |
| 2009/0190746 A1 | 7/2009 | Chishti et al. | |
| 2009/0190747 A1 | 7/2009 | Spottiswoode | |
| 2009/0190748 A1 | 7/2009 | Chishti et al. | |
| 2009/0190749 A1 | 7/2009 | Xie et al. | |
| 2009/0190750 A1 | 7/2009 | Xie et al. | |
| 2009/0232294 A1 | 9/2009 | Xie et al. | |
| 2009/0234710 A1 | 9/2009 | Belgaied Hassine et al. | |
| 2009/0245493 A1 | 10/2009 | Chen et al. | |
| 2009/0304172 A1 | 12/2009 | Becerra et al. | |
| 2009/0318111 A1 | 12/2009 | Desai et al. | |
| 2009/0323921 A1 | 12/2009 | Spottiswoode et al. | |
| 2010/0020959 A1 | 1/2010 | Spottiswoode | |
| 2010/0020961 A1 | 1/2010 | Spottiswoode | |
| 2010/0054431 A1 | 3/2010 | Jaiswal et al. | |
| 2010/0054452 A1 | 3/2010 | Afzal | |
| 2010/0054453 A1 | 3/2010 | Stewart | |
| 2010/0086120 A1 | 4/2010 | Brussat et al. | |
| 2010/0111285 A1 | 5/2010 | Chishti | |
| 2010/0111286 A1 | 5/2010 | Chishti | |
| 2010/0111287 A1 | 5/2010 | Xie et al. | |
| 2010/0111288 A1 | 5/2010 | Afzal et al. | |
| 2010/0142698 A1 | 6/2010 | Spottiswoode et al. | |
| 2010/0158238 A1 | 6/2010 | Saushkin | |
| 2010/0161315 A1* | 6/2010 | Melamed | G06F 40/216 704/9 |
| 2010/0183138 A1 | 7/2010 | Spottiswoode et al. | |
| 2011/0022357 A1 | 1/2011 | Vock et al. | |
| 2011/0031112 A1 | 2/2011 | Birang et al. | |
| 2011/0044447 A1* | 2/2011 | Morris | G06T 11/206 379/265.03 |
| 2011/0069821 A1 | 3/2011 | Korolev et al. | |
| 2011/0125048 A1 | 5/2011 | Causevic et al. | |
| 2011/0184905 A1* | 7/2011 | Phillips | G06F 11/3476 707/602 |
| 2012/0051536 A1 | 3/2012 | Chishti et al. | |
| 2012/0051537 A1 | 3/2012 | Chishti et al. | |
| 2012/0224680 A1 | 9/2012 | Spottiswoode et al. | |
| 2012/0237016 A1* | 9/2012 | Hegde | H04M 3/5175 379/265.01 |
| 2012/0278136 A1 | 11/2012 | Flockhart et al. | |
| 2013/0003959 A1 | 1/2013 | Nishikawa et al. | |
| 2013/0144816 A1* | 6/2013 | Smith | G16H 70/00 706/12 |
| 2013/0251137 A1 | 9/2013 | Chishti et al. | |
| 2013/0287202 A1 | 10/2013 | Flockhart et al. | |
| 2013/0294588 A1* | 11/2013 | Burger | H04M 3/42382 379/88.01 |
| 2014/0044246 A1 | 2/2014 | Klemm et al. | |
| 2014/0079210 A1 | 3/2014 | Kohler et al. | |
| 2014/0119531 A1 | 5/2014 | Tuchman et al. | |
| 2014/0119533 A1 | 5/2014 | Spottiswoode et al. | |
| 2014/0140494 A1* | 5/2014 | Zhakov | H04M 3/5175 379/265.03 |

(56) References Cited

U.S. PATENT DOCUMENTS

| | | | |
|---|---|---|---|
| 2014/0143018 A1* | 5/2014 | Nies | G06Q 30/016 705/7.32 |
| 2014/0173078 A1* | 6/2014 | McCord | H04L 45/44 709/223 |
| 2014/0201225 A1* | 7/2014 | Deshmukh | G06F 16/20 707/758 |
| 2014/0341370 A1 | 11/2014 | Li et al. | |
| 2015/0032746 A1* | 1/2015 | Lev-Tov | G06F 16/243 707/737 |
| 2015/0055772 A1 | 2/2015 | Klemm et al. | |
| 2015/0189078 A1* | 7/2015 | Sittin | H04M 3/42221 379/85 |
| 2015/0271330 A1* | 9/2015 | Erel | H04M 3/42221 379/265.03 |
| 2015/0281448 A1 | 10/2015 | Putra et al. | |
| 2015/0287402 A1* | 10/2015 | Okabe | H04M 3/4936 704/249 |
| 2016/0028758 A1* | 1/2016 | Ellis | H04L 63/1433 726/25 |
| 2016/0080573 A1 | 3/2016 | Chishti | |
| 2016/0171100 A1* | 6/2016 | Fujita | G10L 15/00 707/722 |
| 2017/0011302 A1* | 1/2017 | Heckman | G06N 5/047 |
| 2017/0013131 A1 | 1/2017 | Craib | |
| 2017/0026515 A1* | 1/2017 | Bernstein | G10L 25/48 |
| 2017/0134577 A1* | 5/2017 | Wold | G10L 17/00 |
| 2017/0272571 A1* | 9/2017 | Spiessbach | H04M 3/42221 |
| 2017/0316438 A1 | 11/2017 | Konig et al. | |
| 2017/0344963 A1* | 11/2017 | Bryars | G06Q 20/0855 |
| 2018/0005152 A1* | 1/2018 | Carter | G06Q 10/0637 |
| 2018/0165688 A1* | 6/2018 | Ismail | G06Q 30/02 |

FOREIGN PATENT DOCUMENTS

| | | |
|---|---|---|
| AU | 2009311534 B2 | 8/2014 |
| CN | 102301688 B | 5/2014 |
| CN | 102017591 B | 11/2014 |
| EP | 0 493 292 A2 | 7/1992 |
| EP | 0 949 793 A1 | 10/1999 |
| EP | 1 032 188 A1 | 8/2000 |
| EP | 1335572 A2 | 8/2003 |
| EP | 2338270 B1 | 4/2018 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-236393 A | 8/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2011-511533 A | 4/2011 |
| JP | 2011-511536 A | 4/2011 |
| JP | 5421928 B2 | 2/2014 |
| JP | 5631326 B2 | 11/2014 |
| JP | 5649575 B2 | 1/2015 |
| JP | 2015-514371 A | 5/2015 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| WO | WO-1999/017517 A1 | 4/1999 |
| WO | WO-2001/063894 A2 | 8/2001 |
| WO | WO-2006/124113 A2 | 11/2006 |
| WO | WO-2009/097018 A1 | 8/2009 |
| WO | WO-2010/053701 A2 | 5/2010 |
| WO | WO-2011/081514 A1 | 7/2011 |

OTHER PUBLICATIONS

Anonymous. (2006) "Performance Based Routing in Profit Call Centers," The Decision Makers' Direct, located at www.decisioncraft. com, Issue Jun. 2002 (3 pages).
Canadian Office Action issued in Canadian Patent Application No. 2713526, dated Oct. 25, 2016, 7 pages.
Cleveland, William S., "Robust Locally Weighted Regression and Smoothing Scatterplots," Journal of the American Statistical Association, vol. 74, No. 368, pp. 829-836 (Dec. 1979).
Extended European Search Report issued by the European Patent Office for European Application No. 17154781.3 dated May 4, 2017 (7 pages).
Extended European Search Report issued by the European Patent Office for European Application No. 17171761.4 dated Aug. 30, 2017 (8 pages).
Gans, N. et al. (2003), "Telephone Call Centers: Tutorial, Review and Research Prospects," Manufacturing & Service Operations Management, vol. 5, No. 2, pp. 79-141, 84 pages.
International Preliminary Report on Patentability issued in connection with PCT Application No. PCT/US2009/066254 dated Jun. 14, 2011 (6 pages).
International Search Report and Written Opinion issued by the European Patent Office as International Searching Authority for International Application No. PCT/IB2016/001762 dated Feb. 20, 2017 (15 pages).
International Search Report and Written Opinion issued by the European Patent Office as International Searching Authority for International Application No. PCT/IB2016/001776 dated Mar. 3, 2017 (16 pages).
International Search Report and Written Opinion issued by the European Patent Office as International Searching Authority for International Application No. PCT/IB2017/000570 dated Jun. 30, 2017 (13 pages).
International Search Report issued in connection with International Application No. PCT/US13/33268 dated May 31, 2013 (2 pages).
International Search Report issued in connection with PCT Application No. PCT/US/2009/054352 dated Mar. 12, 2010, 5 pages.
International Search Report issued in connection with PCT Application No. PCT/US2008/077042 dated Mar. 13, 2009 (3 pages).
International Search Report issued in connection with PCT Application No. PCT/US2009/031611 dated Jun. 3, 2009 (5 pages).
International Search Report issued in connection with PCT Application No. PCT/US2009/066254 dated Feb. 24, 2010 (4 pages).
International Search Report issued in connection with PCT/US2009/061537 dated Jun. 7, 2010 (5 pages).
International Search Report issued in connection with PCT/US2013/033261 dated Jun. 14, 2013 (3 pages).
International Search Report issued in connection with PCT/US2013/33265 dated Jul. 9, 2013 (2 pages).
Japanese Office Action issued by the Japan Patent Office for Application No. 2015-503396 dated Jun. 29, 2016 (7 pages).
Japanese Office Action issued by the Japanese Patent Office for Japanese Application No. 2016-159338 dated Oct. 11, 2017 (12 pages).
Japanese Office Action issued by the Japanese Patent Office for Japanese Application No. 2016-189126 dated Oct. 19, 2017 (24 pages).
Koole, G. (2004). "Performance Analysis and Optimization in Customer Contact Centers," Proceedings of the Quantitative Evaluation of Systems, First International Conference, Sep. 27-30, 2004 (4 pages).
Koole, G. et al. (Mar. 6, 2006). "An Overview of Routing and Staffing Algorithms in Multi-Skill Customer Contact Centers," Manuscript, 42 pages.
Ntzoufras, "Bayesian Modeling Using Winbugs". Wiley Interscience, Chapter 5, Normal Regression Models, Oct. 18, 2007, pp. 155-220 (67 pages).

(56) References Cited

OTHER PUBLICATIONS

Press, W. H. and Rybicki, G. B., "Fast Algorithm for Spectral Analysis of Unevenly Sampled Data," The Astrophysical Journal, vol. 338, pp. 277-280 (Mar. 1, 1989).
Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.
Stanley et al., "Improving call center operations using performance-based routing strategies," Calif. Journal of Operations Management, 6(1), 24-32, Feb. 2008; retrieved from http://userwww.sfsu.edu/saltzman/Publist.html.
Subsequent Substantive Examination Report issued in connection with Philippines Application No. 1-2010-501705 dated Jul. 14, 2014 (1 page).
Substantive Examination Report issued in connection with Philippines Application No. 1/2011/500868 dated May 2, 2014 (1 page).
Written Opinion of the International Searching Aurhority issued in connection with PCT Application No. PCT/US2008/077042 dated Mar. 13, 2009, 6 pages.
Written Opinion of the International Searching Authority issued in connection with International Application No. PCT/US13/33268 dated May 31, 2013, 7 pages.
Written Opinion of the International Searching Authority issued in connection with PCT Application No. PCT/US/2009/054352 dated Mar. 12, 2010, 5 pages.
Written Opinion of the International Searching Authority issued in connection with PCT Application No. PCT/US2009/031611 dated Jun. 3, 2009, 7 pages.
Written Opinion of the International Searching Authority issued in connection with PCT Application No. PCT/US2009/066254 dated Feb. 24, 2010, 5 pages.
Written Opinion of the International Searching Authority issued in connection with PCT/US2009/061537 dated Jun. 7, 2010, 10 pages.
Written Opinion of the International Searching Authority issued in connection with PCT/US2013/033261 dated Jun. 14, 2013, 7 pages.
Written Opinion of the International Searching Authority issued in connection with PCT/US2013/33265 dated Jul. 9, 2013, 7 pages.
European Extended Search Report issued by the European Patent Office for European Patent Application No. 18202932.2 dated Nov. 22, 2018 (8 pages).

\* cited by examiner

TECHNIQUES FOR DATA MATCHING IN A CONTACT CENTER SYSTEM

FIELD OF THE DISCLOSURE

This disclosure generally relates to analyzing contact center data and, more particularly, to techniques for data matching in a contact center system.

BACKGROUND OF THE DISCLOSURE

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email). At other times, the contact center may have contacts waiting in one or more queues for an agent to become available for assignment.

In some typical contact centers, contacts are assigned to agents ordered based on time of arrival, and agents receive contacts ordered based on the time when those agents became available. This strategy may be referred to as a "first-in, first-out", "FIFO", or "round-robin" strategy. In other typical contact centers, other strategies may be used, such as "performance-based routing", or a "PBR" strategy.

In other, more advanced contact centers, contacts are paired with agents using a "behavioral pairing", or a "BP" strategy, under which contacts and agents may be deliberately (preferentially) paired in a fashion that enables the assignment of subsequent contact-agent pairs such that when the benefits of all the assignments under a BP strategy are totaled they may exceed those of FIFO and other strategies such as performance-based routing ("PBR") strategies. BP is designed to encourage balanced utilization of agents within a skill queue while nevertheless simultaneously improving overall contact center performance beyond what FIFO or PBR methods will allow. This is a remarkable achievement inasmuch as BP acts on the same calls and same agents as FIFO or PBR methods, utilizes agents approximately evenly as FIFO provides, and yet improves overall contact center performance. BP is described in, e.g., U.S. Pat. No. 9,300,802, which is incorporated by reference herein. Additional information about these and other features regarding the pairing or matching modules (sometimes also referred to as "SATMAP", "routing system", "routing engine", etc.) is described in, for example, U.S. Pat. No. 8,879,715, which is incorporated by reference herein.

A BP strategy may use the outcomes of interactions between contacts and agents to build and iteratively improve pairing models. However, in some typical contact centers, outcome records may be stored separately and in an unstructured/unrelated manner relative to information stored about contact assignments to agents.

In view of the foregoing, it may be understood that there may be a need for a system that improves the accuracy of data matching for contact interaction data and contact interaction outcome data to improve the efficiency and performance of pairing strategies that are designed to choose among multiple possible pairings such as a BP strategy.

SUMMARY OF THE DISCLOSURE

Techniques for data matching in a contact center system are disclosed. In one particular embodiment, the techniques may be realized as a method for data matching in a contact center system comprising determining, by at least one computer processor communicatively coupled to and configured to operate in the contact center system, an interaction event time associated with a historical contact interaction; determining, by the at least one computer processor, an outcome event time associated with a historical contact interaction outcome; analyzing, by the at least one computer processor, the interaction event time and the outcome event time to determine a correlation; and matching, by the at least one computer processor, the historical contact interaction with the historical contact interaction outcome based on the correlation.

In accordance with other aspects of this particular embodiment, the interaction event time may be a time window, and the outcome event time may be a timestamp.

In accordance with other aspects of this particular embodiment, the method may further comprise extending, by the at least one computer processor, the interaction event time to a longer event duration prior to analyzing the interaction event time.

In accordance with other aspects of this particular embodiment, the outcome event time may lie outside the interaction event time.

In accordance with other aspects of this particular embodiment, the outcome event time may occur after an end of the interaction event time.

In accordance with other aspects of this particular embodiment, the method may further comprise retrieving, by the at least one computer processor, data for the historical contact interaction from a first data source; and retrieving, by the at least one computer processor, data for the historical contact interaction outcome from a second data source different from the first data source.

In accordance with other aspects of this particular embodiment, the method may further comprise discovering, by the at least one computer processor, a clock synchronization issue between the first and second data sources; and automatically correcting, by the at least one computer processor, the clock synchronization issue.

In accordance with other aspects of this particular embodiment, the method may further comprise generating, by the at least one computer processor, a contact-agent pairing model based on the matching of the historical contact interaction and the historical contact interaction outcome for optimizing contact-agent pairings in the contact center system.

In accordance with other aspects of this particular embodiment, the method may further comprise under-constraining, by the at least one computer processor, the analyzing, wherein the under-constraining results in a higher match rate and less accurate matches.

In accordance with other aspects of this particular embodiment, the method may further comprise over-constraining, by the at least one computer processor, the analyzing, wherein the over-constraining results in a lower match rate and more accurate matches.

In accordance with other aspects of this particular embodiment, the method may further comprise determining, by the at least one computer processor, a probability that the matching of the historical contact interaction and the historical contact interaction outcome is accurate.

In accordance with other aspects of this particular embodiment, the method may further comprise determining, by the at least one computer processor, a probability that a plurality of matched historical contact interactions and contact interaction outcomes is accurate.

In another particular embodiment, the techniques may be realized as a system for data matching in a contact center system comprising at least one computer processor communicatively coupled to and configured to operate in the contact center system, wherein the at least one computer processor is further configured to perform the steps in the above-described method.

In another particular embodiment, the techniques may be realized as an article of manufacture for data matching in a contact center system comprising a non-transitory processor readable medium and instructions stored on the medium, wherein the instructions are configured to be readable from the medium by at least one computer processor communicatively coupled to and configured to operate in the contact center system and thereby cause the at least one computer processor to operate so as to perform the steps in the above-described method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email). At other times, the contact center may have contacts waiting in one or more queues for an agent to become available for assignment.

In some typical contact centers, contacts are assigned to agents ordered based on time of arrival, and agents receive contacts ordered based on the time when those agents became available. This strategy may be referred to as a "first-in, first-out", "FIFO", or "round-robin" strategy. In other typical contact centers, other strategies may be used, such as "performance-based routing", or a "PBR" strategy.

In other, more advanced contact centers, contacts are paired with agents using a "behavioral pairing", or a "BP" strategy, under which contacts and agents may be deliberately (preferentially) paired in a fashion that enables the assignment of subsequent contact-agent pairs such that when the benefits of all the assignments under a BP strategy are totaled they may exceed those of FIFO and other strategies such as performance-based routing ("PBR") strategies. BP is designed to encourage balanced utilization of agents within a skill queue while nevertheless simultaneously improving overall contact center performance beyond what FIFO or PBR methods will allow. This is a remarkable achievement inasmuch as BP acts on the same calls and same agents as FIFO or PBR methods, utilizes agents approximately evenly as FIFO provides, and yet improves overall contact center performance. BP is described in, e.g., U.S. Pat. No. 9,300,802, which is incorporated by reference herein. Additional information about these and other features regarding the pairing or matching modules (sometimes also referred to as "SATMAP", "routing system", "routing engine", etc.) is described in, for example, U.S. Pat. No. 8,879,715, which is incorporated by reference herein.

A BP strategy may use the outcomes of interactions between contacts and agents to build and iteratively improve pairing models. However, in some typical contact centers, outcome records may be stored separately and in an unstructured/unrelated manner relative to information stored about contact assignments to agents.

In view of the foregoing, it may be understood that there is a need for a system that improves the accuracy of data matching for contact interaction data and contact interaction outcome data, so as to improve the efficiency and performance of pairing strategies that are designed to choose among multiple possible pairings such as a BP strategy.

Figure 1:
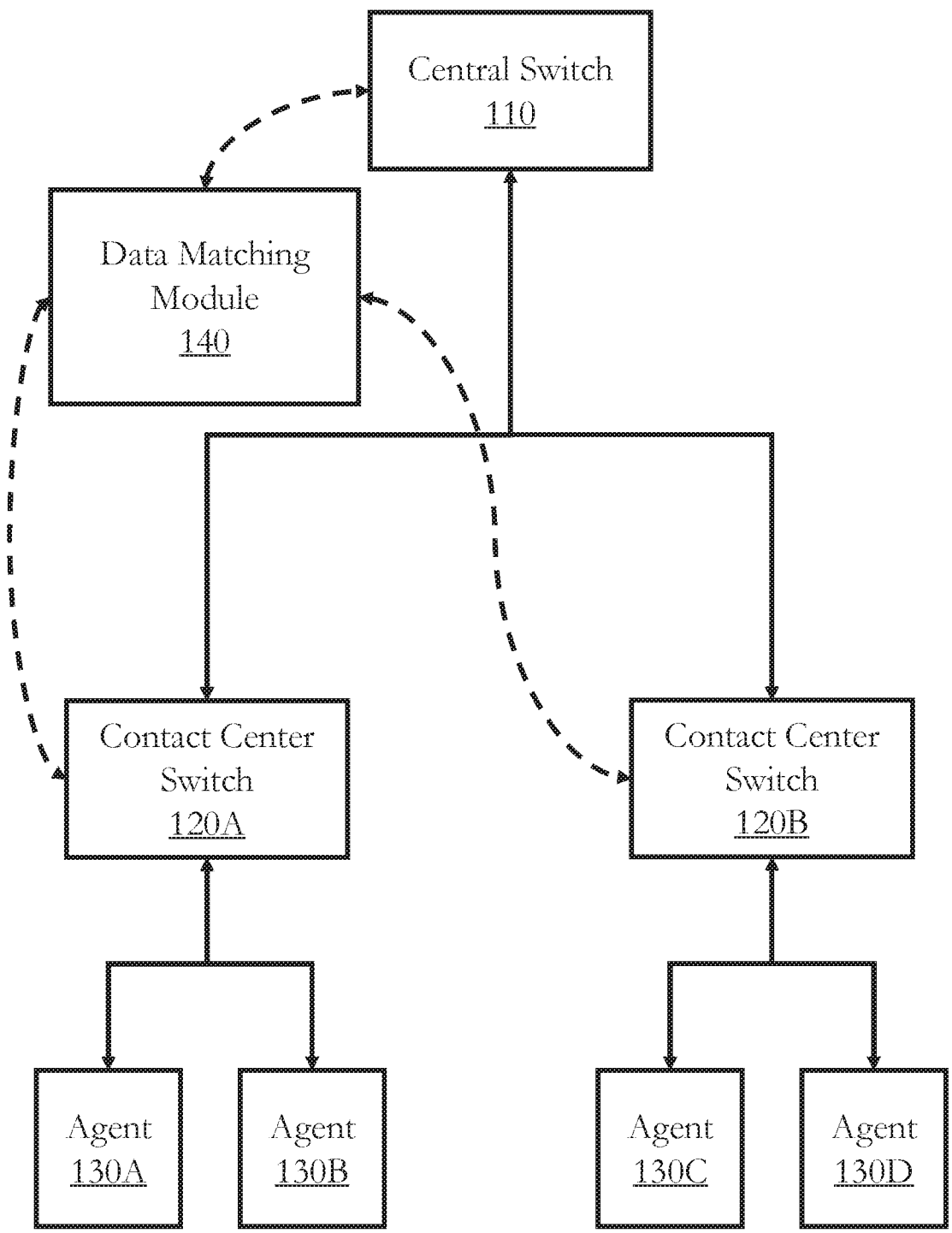
FIG. 1 shows a block diagram of a contact center system according to embodiments of the present disclosure.

FIG. 1 shows a block diagram of a contact center system 100 according to embodiments of the present disclosure. The description herein describes network elements, computers, and/or components of a system and method for simulating contact center systems that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the contact center system 100 may include a central switch 110. The central switch 110 may receive incoming contacts (e.g., callers) or support outbound connections to contacts via a telecommunications network (not shown). The central switch 110 may include contact routing hardware and software for helping to route contacts among one or more contact centers, or to one or more PBX/ACDs or other queuing or switching components, including other Internet-based, cloud-based, or otherwise networked contact-agent hardware or software-based contact center solutions.

The central switch 110 may not be necessary such as if there is only one contact center, or if there is only one PBX/ACD routing component, in the contact center system 100. If more than one contact center is part of the contact center system 100, each contact center may include at least one contact center switch (e.g., contact center switches 120A and 120B). The contact center switches 120A and 120B may be communicatively coupled to the central switch 110. In embodiments, various topologies of routing and network components may be configured to implement the contact center system.

Each contact center switch for each contact center may be communicatively coupled to a plurality (or "pool") of agents. Each contact center switch may support a certain number of agents (or "seats") to be logged in at one time. At any given time, a logged-in agent may be available and waiting to be connected to a contact, or the logged-in agent may be unavailable for any of a number of reasons, such as being connected to another contact, performing certain post-call functions such as logging information about the call, or taking a break.

In the example of FIG. 1, the central switch 110 routes contacts to one of two contact centers via contact center switch 120A and contact center switch 120B, respectively. Each of the contact center switches 120A and 120B are shown with two agents each. Agents 130A and 130B may be logged into contact center switch 120A, and agents 130C and 130D may be logged into contact center switch 120B.

The contact center system 100 may also be communicatively coupled to an integrated service from, for example, a third party vendor. In the example of FIG. 1, data matching module 140 may be communicatively coupled to one or more switches in the switch system of the contact center system 100, such as central switch 110, contact center switch 120A, or contact center switch 120B. In some embodiments, switches of the contact center system 100 may be communicatively coupled to multiple data matching modules. In some embodiments, data matching module 140 may be embedded within a component of a contact center system (e.g., embedded in or otherwise integrated with a switch, or a "BP switch"). The data matching module 140 may receive information from a switch (e.g., contact center switch 120A) about agents logged into the switch (e.g., agents 130A and 130B) and about incoming contacts via another switch (e.g., central switch 110) or, in some embodiments, from a network (e.g., the Internet or a telecommunications network) (not shown).

A contact center may include multiple pairing modules (e.g., a BP module and a FIFO module) (not shown), and one or more pairing modules may be provided by one or more different vendors. In some embodiments, one or more pairing modules may be components of data matching module 140 or one or more switches such as central switch 110 or contact center switches 120A and 120B. In some embodiments, a BP module may determine which pairing module may handle pairing for a particular contact. For example, the BP module may alternate between enabling pairing via the BP module and enabling pairing with the FIFO module. In other embodiments, one pairing module (e.g., the BP module) may be configured to emulate other pairing strategies. For example, a BP module, or a BP component integrated with BP components in the BP module, may determine whether the BP module may use BP pairing or emulated FIFO pairing for a particular contact. In this case, "BP on" may refer to times when the BP module is applying the BP pairing strategy, and "BP off" may refer to other times when the BP module is applying a different pairing strategy (e.g., FIFO).

In some embodiments, regardless of whether pairing strategies are handled by separate modules, or if some pairing strategies are emulated within a single pairing module, the single pairing module may be configured to monitor and store information about pairings made under any or all pairing strategies. For example, a BP module may observe and record data about FIFO pairings made by a FIFO module, or the BP module may observe and record data about emulated FIFO pairings made by a BP module operating in FIFO emulation mode.

Figure 2:
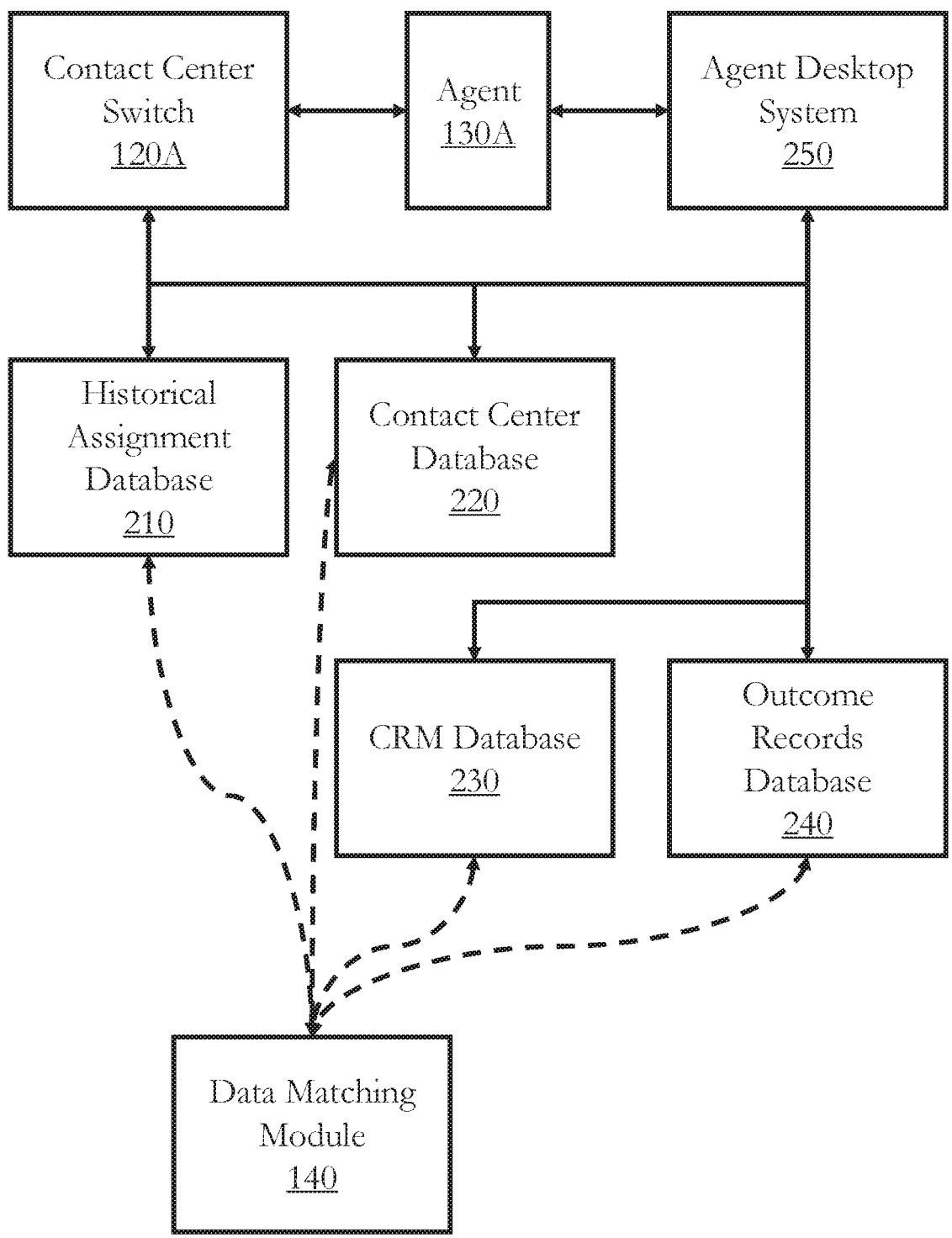
FIG. 2 shows a block diagram of a contact center system according to embodiments of the present disclosure.

FIG. 2 shows a block diagram of a contact center system 200 according to embodiments of the present disclosure. The contact center system 200 may be the same contact center system as contact center system 100 (FIG. 1), with additional modules and storage databases showing examples of where data may be transferred and stored throughout a contact center system.

In the example of contact center system 200, four example storage systems are shown: historical assignment database 210, contact center database 220, customer relationship management ("CRM") database 230, and outcome records database 240. In some embodiments, some types of data stored in these databases may be stored in the same or different databases. Some databases may not be present, and other databases not shown may be present. In some embodiments, a database may be communicatively coupled to the contact center system from a remote (e.g., cloud-based) data center via a network connection. In other embodiments, a database may be co-located with certain contact center equipment on premises. The various databases are shown as being communicatively coupled to various contact center system components. For example, contact center switch 120A is shown as being communicatively coupled to the four aforementioned databases. In some embodiments, contact center switch 120A or other contact center system components may be communicatively coupled to more or fewer databases.

Consider a contact waiting for assignment at contact center switch 120A: When the contact is paired (i.e., assigned) and connected to an agent such as Agent 130A, some information about the assignment may be stored in contact center system 200. For example, a record of the assignment may be stored in historical assignment database 210 and/or the contact center database 220. The record may include an identifier for the contact (e.g., phone number, customer identifier, email address), an identifier for the agent (e.g., agent ID, agent name), a timestamp for the date and time when the assignment was made, and other information relevant for the assignment. In some embodiments, the record may include additional information about the contact's journey through the contact center system, such as interactive voice response ("IVR") or touch-tone menu selections the contact may have made prior to being assigned to Agent 130A in the example of a telephone call.

In some embodiments, the historical assignment database 210 may also track which of several pairing strategies (e.g., BP or FIFO) was used to make the assignment, or whether the assignment was an optimized choice or a constrained choice, such as when a service level agreement has been exceeded for the contact. In some embodiments, one or more databases such as the historical assignment database 210 may be supplied by a third-party vendor, such as a BP vendor.

When the contact disconnects from the contact center system (e.g., hangs up the phone), the contact center switch 120A may record additional information in the historical assignment database 210 and/or the contact center database 220. For example, the contact center switch 120A may be configured to store the disconnect time or the duration of the interaction in one of the databases.

In the example of contact center system 200, contact center switch 120A and/or Agent 130A are communicatively coupled or otherwise connected to agent desktop system

250. In some embodiments, agent desktop system 250 is a computer processor-implemented system for managing various agent tasks. For example, agent desktop system 250 may allow Agent 130A to indicate when Agent 130A is logged into the contact center system 200, when Agent 230A is occupied with a contact interaction (or, in some embodiments, multiple simultaneous interactions such as chat-based interactions), when Agent 130A is idle or otherwise available for another contact interaction, and when Agent 130A is not available (e.g., taking a break, offline).

In some embodiments, agent desktop system 250 may present information about the contact or the contact interaction to Agent 130A during the interaction. For example, agent desktop system 250 may present information from CRM database 230 about the contact's customer relationship with Agent 130A's company, or agent desktop system 250 may present information from contact center database 220 about prior interactions the contact has had with contact center system 200.

In some embodiments, during the interaction and/or after the interaction, Agent 130A may use agent desktop system 250 to input information about the outcome of the interaction. For example, Agent 130A may type notes into agent desktop system 250 that may be stored in contact center database 220 for reference during future interactions. In the case of a sales queue environment, Agent 130A may enter a sales transaction. Data about the sales transaction may be stored in, for example, the outcome records database 240 and/or the CRM database 230. In some situations, data about a sale may be transferred to a fulfillment center or a fulfillment system. In the case of a customer support queue environment, Agent 130A may update the contact's records in one of the databases to reflect the resolution of the call, such as a refund or courtesy credit, an upgrade or downgrade in services, a cancellation of services, or a request to a dispatch center system to schedule a "truck roll" or field agent to attend to the contact's support request.

In any of these cases, agent desktop system 250 may record a timestamp associated with the outcome record in the outcome records database 240 or changes to other records in the CRM database 230 or other database. In some scenarios, the timestamp associated with an agent completing a outcome record such as a sales transaction may be during a contact interaction. In other scenarios, the timestamp associated with the agent completing the outcome record may be after the conclusion of the contact interaction.

For example, consider a contact that arrived at the contact center switch 120A at 10:00 AM. A BP pairing module instructed the contact center switch 120A to pair the contact with Agent 130A, who was available for assignment to the contact. The contact center switch 120A connected the contact to Agent 130A at 10:02 AM, and the interaction began. During the interaction, the contact decided to purchase a new cellphone. Agent 130A recorded the transaction using the agent desktop system 250, completing the transaction at 10:10 AM. Agent 130A subsequently disconnected the call at 10:12 AM. After disconnecting the call, Agent 130A entered a few additional notes in the agent desktop system 250.

The pairing of the contact to Agent 130A by a BP strategy may have been logged in the historical assignment database 210. The date, start time, and end time and/or duration of the contact interaction event may have been logged in, for example, the contact center database 220. The fact that a sale was completed, as well as the type and amount of sale, the date and time of the sale, and identities of the contact and agent who completed the sale, may have been logged in the outcome records database 240. Information about the contact such as the type of the newly purchased cellphone, may have been logged in the CRM database 230. Hundreds or thousands of similar contact interactions may be recorded over the course of an hour or day in a real-world contact center system with dozens, hundreds (or more) agents.

In the example of contact center system 200, data matching module 140 is communicatively coupled with each of the historical assignment database 210, the contact center database 220, the CRM database 230, and the outcome records database 240. In some embodiments, a BP module may need to generate a new pairing model, update an existing pairing model with new data, or benchmark the performance of a BP strategy against the performance of another strategy such as FIFO or PBR. In these embodiments, data matching module 140 may retrieve and match data from at least two disparate or unstructured data sources. In some embodiments, each database may contain structured data; however, the data may not be structured or otherwise related or linked to the data in another database or other storage location. Moreover, in some environments, a database store on one system may be in a different time zone or otherwise out of time synchronization with another database store on another system.

The data matching module 140 may use various techniques for mapping or matching events logged in one database with corresponding events logged in another database. For example, in the call center domain (assuming one caller per agent at a given time), the call start and end time, and an identifier for the agent on the call, may establish a call event across all databases. Additionally, sometimes the call event may extent past the recorded end/disconnect time, such as when an agent takes time after disconnecting from a call to complete a transaction or other record-updating process. The various heuristics or other techniques used by the data matching module 140 may vary from one process or context to the next and across different contact center systems.

For example, a data matching heuristic may be to add two minutes (or more or less time) to the end time of a call event to account for time an agent may take to enter results into a system after a call ends. If Agent 130A recorded a sale at 9:30 AM, it might be correct to match this outcome with a call that ended at 9:29 AM.

For another example, a data matching heuristic may be to reject matching a sale outcome record that occurred earlier than the recorded start time of a call. If Agent 130A recorded a sale at 11:18 AM, it should not be matched with a call that did not begin until 11:19 AM.

In some cases, there may be multiple candidate outcome records for a given call event, or vice versa. In these cases, the data matching module 140 may determine a probability that a given pair of a candidate outcome and interaction event is a correct match. The data matching module 140 may select the pair with the highest probability of correctness. In some environments, it may be possible for multiple outcomes to be associated with one or more interactions. In these environments, the data matching module 140 may perform one-to-many or many-to-many mappings of outcomes to interactions.

For another example, a data matching heuristic may be to reject matching a sale outcome record that occurred relatively early during an interaction. If a call ran from 11:19-11:31 AM, and a sale was recorded at 11:20 AM, the time of the sale fell within the time window of the call. However, it may be unlikely for a sale to occur quickly, just one minute after the call began, only for the call to continue for another 11 minutes. This candidate match may be outright rejected, or otherwise given a low probability of correctness, which a search may continue for a more likely match. For example, another agent may have taken a call from 11:08-11:21 AM. The sale outcome at 11:20 AM is more likely to have occurred during this other call.

In other embodiments, data matching module 140 may assign a probability to a candidate outcome and interaction event. Even if only one such pairing is found for a given interaction event, the match may be accepted or rejected depending on whether the probability exceeds a predetermined threshold (e.g., greater than 50%, 90%, 99.99% likelihood of the match being correct).

In some embodiments, under-constraining the analysis by the data matching module 140 may produce a higher match rate, providing more data but less accurate data. In other embodiments, over-constraining the analysis (i.e., rejecting more matches) may produce a lower match rate, providing less data but more accurate data. For a given degree of constraint and a given mapping resulting from the given constraint, the data matching module 140 may determine a measure of the match rate and/or a measure of the accuracy of the matched data.

In some embodiments, some of the databases communicatively coupled with the contact center system 200 may have incorrect or incomplete records. Data matching module 140 may be trained to identify and flag potential data issues. For example, it is unlikely that for an experienced agent to have zero sales. If an outcome records database suggests that an agent has zero sales, it is more likely that there was an error recording the identity of the agent than that the agent struck out with a 0% conversion rate during the agent's shift. The data matching module 140 may flag this problem so that the contact center system 200 may analyze the problem or raise the issue to a contact center system administrator for troubleshooting.

For another example, if the times from the first call to the last call of a shift as recorded in a contact center database or historical assignment database do not approximately match the times from the first sale to the last sale as recorded in an outcome records database, there may be a problem with the way the data has been recorded. If an outcome records database suggests that the contact center did not make any sales during the last two hours of a shift despite normal call volume, it is more likely that an error occurred with recording sales in the outcome records database. Again, this type of data inconsistency may be detected and reported by the data matching module 140.

For another example, the data matching module 140 may detect that an agent appears to have completed sales outside the time window for the agent's shift. If an agent's shift ended at 3:00 PM, but an outcome records database shows that this agent completed a sale at 5:37 PM, the data matching module 140 may flag and report this inconsistency.

Figure 3:
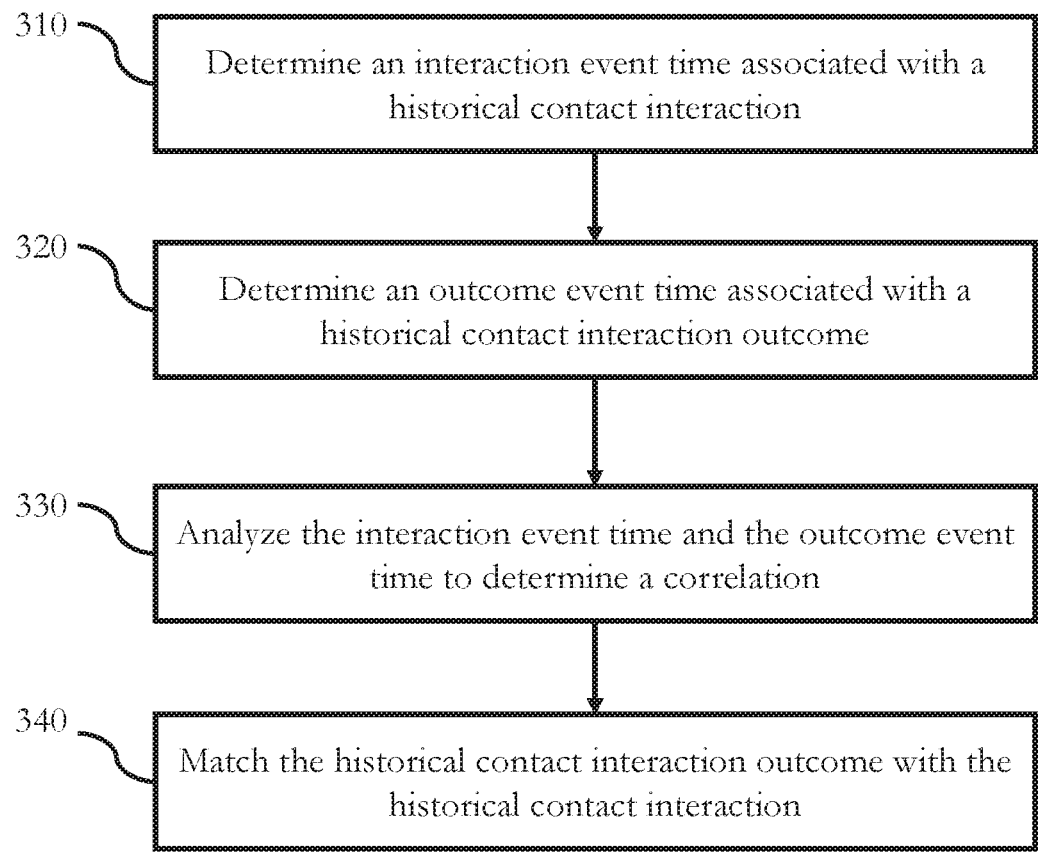
FIG. 3 shows a flow diagram of a data matching method according to embodiments of the present disclosure.

FIG. 3 shows a flow diagram of a data matching method 300 according to embodiments of the present disclosure. Data matching method 300 may begin at block 310.

At block 310, an interaction event time associated with a historical contact interaction may be determined. For example, a data matching module such as data matching module 140 (FIGS. 1 and 2) may retrieve sets of records from various databases such as a historical assignment database 210 (FIG. 2) and/or a contact center database 220 (FIG. 2). The data matching module may determine the event time of the interaction. If the interaction was a telephone call, the event time may be a combination of the start date and time of the call and the end date and time of the call. Having determined the interaction event time associated with the historical contact interaction (or a plurality of historical contact interactions), data matching method 300 may proceed to block 320.

At block 320, an outcome event time associated with a historical contact interaction outcome may be determined. For example, the data matching module may retrieve sets of records from various databases such as a CRM database 230 (FIG. 2) and/or an outcome records database 240 (FIG. 2). The data matching module may determine the outcome (or "result") time of the interaction outcome. If the interaction was a telephone call in a sales queue, the interaction outcome event time may be a time at which a sales transaction was completed. Depending on the environment, the sales transaction could be completed, for example, during the call (e.g., prior to—but close to—the end time of the call), or it could be completed shortly after the end time of the call. Having determined the outcome event time associated with the historical contact interaction outcome/result (or a plurality of historical contact interaction outcomes), data matching method 300 may proceed to block 330. In some embodiments, block 320 may be performed before block 310 or in parallel with block 310.

At block 330, one or more interaction event times determined at block 310 may be analyzed in conjunction with one or more outcome event times determined at block 320 to determine correlations between a pair of an interaction event time and an outcome event time. In some environments, additional data fields may be used to eliminate certain candidate pairs or increase the probability/likelihood that a candidate pair is a correct match. For example, if agent identifiers are stored in both the interaction database and the outcome database, the agent identifier field may be used to eliminate pairs for which the agent identifiers do not match. The data matching module may apply various heuristics and other statistical analysis or machine learning techniques to the data sets to determine correlations for candidate pairs such as those described above with reference to FIG. 2. Having determined one or more correlations for one or more candidate pairs of interaction event times and outcome event times, data matching method 300 may proceed to block 340.

At block 340, one or more candidate pairs may be deemed a correct match (e.g., if the correlation or probability of correctness exceeds a predetermined threshold degree of likelihood). The historical contact interaction outcome may be matched with the historical contact interaction. Matched pairs of interactions and interaction outcomes may be processed (or stored for later processing) by the data matching module or another module (such as a BP module or a benchmarking module) to create or improve a pairing model, or to assess the performance of one pairing strategy against another. Having matched one or more pairs of historical contact interaction outcomes with historical contact interactions, data matching method 300 may end. In some embodiments, data matching method 300 may return to block 310 for further processing of new or otherwise additional interaction events and outcome events.

At this point it should be noted that data matching in a contact center system in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with data matching in a contact center system in accordance with the present disclosure as described above. Alternatively, one or more processors operating in accordance with instructions may implement the functions associated with data matching in a contact center system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for data matching in a contact center system comprising:
   determining, by at least one computer processor in a data matching module communicatively coupled to at least one switch of the contact center system and configured to perform data matching operations in the contact center system, an interaction event time associated with a historical contact interaction from a contact interaction database, wherein the contact interaction database is communicatively coupled to the data matching module;
   determining, by the at least one computer processor, an outcome event time associated with a historical contact interaction outcome from an outcome database, wherein the outcome database is communicatively coupled to the data matching module;
   analyzing, by the at least one computer processor, the interaction event time and the outcome event time to determine a correlation probability that the historical contact interaction outcome resulted from the historical contact interaction; and
   matching, by the at least one computer processor, the historical contact interaction with the historical contact interaction outcome based on the correlation probability, wherein the contact interaction database and the outcome database have different, uncorrelated structures.

2. The method of claim 1, wherein the interaction event time is a time window.

3. The method of claim 1, wherein the outcome event time is a timestamp.

4. The method of claim 1, further comprising:
   extending, by the at least one computer processor, the interaction event time to a longer event duration prior to analyzing the interaction event time.

5. The method of claim 1, wherein the outcome event time lies outside of the interaction event time.

6. The method of claim 1, wherein the outcome event time occurs after an end of the interaction event time.

7. The method of claim 1, further comprising:
   retrieving, by the at least one computer processor, data for the historical contact interaction from a first data source; and
   retrieving, by the at least one computer processor, data for the historical contact interaction outcome from a second data source different from the first data source.

8. The method of claim 7, further comprising:
   discovering, by the at least one computer processor, a clock synchronization issue between the first and second data sources; and
   automatically correcting, by the at least one computer processor, the clock synchronization issue.

9. The method of claim 1, further comprising:
   generating, by the at least one computer processor, a contact-agent pairing model based on the matching of the historical contact interaction and the historical contact interaction outcome for optimizing contact-agent pairings in the contact center system.

10. The method of claim 1, further comprising:
    under-constraining, by the at least one computer processor, the analyzing, wherein the under-constraining results in a higher match rate and less accurate matches.

11. The method of claim 1, further comprising:
    over-constraining, by the at least one computer processor, the analyzing, wherein the over-constraining results in a lower match rate and more accurate matches.

12. The method of claim 1, further comprising:
    determining, by the at least one computer processor, a probability that the matching of the historical contact interaction and the historical contact interaction outcome is accurate.

13. The method of claim 1, further comprising:
    determining, by the at least one computer processor, a probability that a plurality of matched historical contact interactions and contact interaction outcomes is accurate.

14. A system for data matching in a contact center system comprising:
    at least one computer processor in a data matching module communicatively coupled to at least one switch of the contact center system and configured to perform data matching operations in the contact center system, wherein the at least one computer processor is further configured to:
       determine an interaction event time associated with a historical contact interaction from a contact interaction database, wherein the contact interaction database is communicatively coupled to the data matching module;
       determine an outcome event time associated with a historical contact interaction outcome from an outcome database, wherein the outcome database is communicatively coupled to the data matching module;
       analyze the interaction event time and the outcome event time to determine a correlation probability that the historical contact interaction outcome resulted from the historical contact interaction; and
       match the historical contact interaction with the historical contact interaction outcome based on the correlation probability, wherein the contact interaction database and the outcome database have different, uncorrelated structures.

15. The system of claim 14, wherein the interaction event time is a time window.

16. The system of claim 14, wherein the outcome event time is a timestamp.

17. The system of claim 14, wherein the at least one computer processor is further configured to:
extend the interaction event time to a longer event duration prior to analyzing the interaction event time.

18. The system of claim 14, wherein the outcome event time lies outside of the interaction event time.

19. The system of claim 14, wherein the outcome event time occurs after an end of the interaction event time.

20. The system of claim 14, wherein the at least one computer processor is further configured to:
retrieve data for the historical contact interaction from a first data source; and
retrieve data for the historical contact interaction outcome from a second data source different from the first data source.

21. The system of claim 20, wherein the at least one computer processor is further configured to:
discover a clock synchronization issue between the first and second data sources; and
automatically correct the clock synchronization issue.

22. The system of claim 14, wherein the at least one computer processor is further configured to:
generate a contact-agent pairing model based on the matching of the historical contact interaction and the historical contact interaction outcome for optimizing contact-agent pairings in the contact center system.

23. The system of claim 14, wherein the at least one computer processor is further configured to:
under-constrain the analyzing, wherein the under-constraining results in a higher match rate and less accurate matches.

24. The system of claim 14, wherein the at least one computer processor is further configured to:
over-constrain the analyzing, wherein the over-constraining results in a lower match rate and more accurate matches.

25. The system of claim 14, wherein the at least one computer processor is further configured to:
determine a probability that the matching of the historical contact interaction and the historical contact interaction outcome is accurate.

26. The system of claim 14, wherein the at least one computer processor is further configured to:
determine a probability that a plurality of matched historical contact interactions and contact interaction outcomes is accurate.

27. An article of manufacture for data matching in a contact center system comprising:
a non-transitory processor readable medium; and
instructions stored on the medium;
wherein the instructions are configured to be readable from the medium by at least one computer processor in a data matching module communicatively coupled to at least one switch of the contact center system and configured to perform data matching operations in the contact center system and thereby cause the at least one computer processor to operate so as to:
determine an interaction event time associated with a historical contact interaction from a contact interaction database, wherein the contact interaction database is communicatively coupled to the data matching module;
determine an outcome event time associated with a historical contact interaction outcome from an outcome database, wherein the outcome database is communicatively coupled to the data matching module;
analyze the interaction event time and the outcome event time to determine a correlation probability that the historical contact interaction outcome resulted from the historical contact interaction; and
match the historical contact interaction with the historical contact interaction outcome based on the correlation probability, wherein the contact interaction database and the outcome database have different, uncorrelated structures.

28. The article of manufacture of claim 27, wherein the at least one computer processor is further caused to operate so as to:
extend the interaction event time to a longer event duration prior to analyzing the interaction event time.

29. The article of manufacture of claim 27, wherein the outcome event time occurs after an end of the interaction event time.

* * * * *